United States Patent
Nonaka et al.

(10) Patent No.: US 10,094,405 B2
(45) Date of Patent: Oct. 9, 2018

(54) JOINT STRUCTURE FOR COMPOSITE MEMBER

(71) Applicant: MITSUBISHI HEAVY INDUSTRIES, LTD., Tokyo (JP)

(72) Inventors: Yoshinori Nonaka, Tokyo (JP); Masahiro Kashiwagi, Tokyo (JP); Toshio Abe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/360,754

(22) PCT Filed: Dec. 17, 2012

(86) PCT No.: PCT/JP2012/082644
§ 371 (c)(1),
(2) Date: May 27, 2014

(87) PCT Pub. No.: WO2013/099673
PCT Pub. Date: Jul. 4, 2013

(65) Prior Publication Data
US 2015/0093185 A1 Apr. 2, 2015

(30) Foreign Application Priority Data
Dec. 20, 2011 (JP) .................... 2011-288838

(51) Int. Cl.
*F16B 5/12* (2006.01)
*B29C 65/56* (2006.01)
(Continued)

(52) U.S. Cl.
CPC .............. *F16B 5/12* (2013.01); *B29C 65/562* (2013.01); *B29C 66/1122* (2013.01);
(Continued)

(58) Field of Classification Search
CPC ....... B29C 65/562; B29C 65/48; B29C 65/72; B29C 66/1122; B29C 66/474;
(Continued)

(56) References Cited

U.S. PATENT DOCUMENTS 3,828,515 A * 8/1974 Galgoczy et al. ............ 403/279
3,879,916 A * 4/1975 Bigham ......................... 52/463
(Continued)

FOREIGN PATENT DOCUMENTS

CN 102649316 A 8/2012
DE 19816099 10/1999
(Continued)

OTHER PUBLICATIONS

English Language Machine Translation of DE19925953C1. [Retrieved on Feb. 10, 2016]. Retrieved from the Internet: <URL: http://translationportal.epo.org/emtp/translate/?ACTION=description-retrieval&COUNTRY=DE&ENGINE=google&FORMAT=docdb&KIND=C1&LOCALE=en_EP&NUMBER=19925953&OPS=ops.epo.org/3.1&SRCLANG=de&TRGLANG=en>.*
(Continued)

*Primary Examiner* — Matthieu F Setliff
(74) *Attorney, Agent, or Firm* — Wenderoth, Lind & Ponack, L.L.P.

(57) ABSTRACT

A joint structure (1) for a composite member made from a composite material. The joint structure includes a plate for increasing thickness (40a, 40b) adhered to at least one side of the composite member (10). The composite member (10) and a counterpart member (20) are fastened together by inserting and fixing a fastener member (30) into a through-hole (24, 26) formed through the composite member (10), the plate for increasing thickness (40a, 40b), and the counterpart member (20) to be joined to the composite member.

6 Claims, 4 Drawing Sheets

(51) Int. Cl.
*B29C 65/00* (2006.01)
*F16B 5/02* (2006.01)
*B29C 65/48* (2006.01)
*B29C 65/72* (2006.01)

(52) U.S. Cl.
CPC .......... *B29C 66/474* (2013.01); *B29C 66/721* (2013.01); *B29C 65/48* (2013.01); *B29C 65/72* (2013.01); *B29C 66/71* (2013.01); *B29C 66/7212* (2013.01); *B29C 66/7394* (2013.01); *B29C 66/73941* (2013.01); *F16B 5/02* (2013.01); *Y10T 403/472* (2015.01); *Y10T 403/75* (2015.01)

(58) Field of Classification Search
CPC ... B29C 66/721; B29C 66/71; B29C 66/7212; B29C 66/7394; B29C 66/73941; F16B 5/02; F16B 5/0607; F16B 5/00621; F16B 5/0642; F16B 5/065; F16B 5/12; F16B 5/0685
See application file for complete search history.

(56) References Cited

U.S. PATENT DOCUMENTS

| | | | | |
|---|---|---|---|---|
| 4,579,475 | A * | 4/1986 | Hart-Smith et al. | 403/312 |
| 4,878,795 | A * | 11/1989 | Woodrow et al. | 411/501 |
| 5,222,827 | A * | 6/1993 | Joanides | 403/408.1 |
| 6,320,118 | B1 * | 11/2001 | Pridham et al. | 174/2 |
| 6,546,689 | B1 | 4/2003 | Kim | 52/698 |
| 6,775,895 | B2 * | 8/2004 | Koffi et al. | 29/407.08 |
| 7,678,437 | B2 * | 3/2010 | Escobar Benavides | B29C 66/1122 244/131 |
| 7,721,495 | B2 * | 5/2010 | Kismarton | 52/309.16 |
| 7,857,258 | B2 * | 12/2010 | Normand et al. | 244/120 |
| 8,795,804 | B2 | 8/2014 | Hamada et al. | |
| 2003/0080251 | A1 | 5/2003 | Anast | |
| 2006/0060705 | A1 | 3/2006 | Stulc et al. | |
| 2006/0236652 | A1 * | 10/2006 | Kismarton | 52/782.1 |
| 2010/0065688 | A1 * | 3/2010 | Wood | 244/131 |
| 2010/0119836 | A1 * | 5/2010 | Naritomi et al. | 428/416 |
| 2010/0151200 | A1 * | 6/2010 | Naritomi et al. | 428/147 |
| 2010/0320320 | A1 * | 12/2010 | Kismarton | 244/119 |
| 2012/0045613 | A1 | 2/2012 | Sanderson | |
| 2012/0219763 | A1 | 8/2012 | Hamada et al. | |

FOREIGN PATENT DOCUMENTS

| | | | | |
|---|---|---|---|---|
| DE | 19816099 | A1 * | 10/1999 | E04B 1/58 |
| DE | 19925953 | C1 * | 9/2000 | |
| DE | 102004045845 | B3 * | 12/2005 | B29C 65/562 |
| EP | 2 143 558 | | 1/2010 | |
| JP | 58-71151 | | 4/1983 | |
| JP | 59-174217 | | 11/1984 | |
| JP | 11029034 | A * | 2/1999 | |
| JP | 2010-240930 | | 10/2010 | |
| JP | 2011-42030 | | 3/2011 | |
| WO | 2010/122325 | | 10/2010 | |

OTHER PUBLICATIONS

International Preliminary Report on Patentability dated Jul. 1, 2014 in corresponding International Application No. PCT/JP2012/082644 (with English translation).
International Search Report dated Jan. 29, 2013 in corresponding International Application No. PCT/JP2012/082644.
The First Office Action dated Mar. 23, 2015 in corresponding Chinese Application No. 201280061574.1 (with English translation).
Extended European Search Report dated Nov. 24, 2015 in corresponding European patent application No. 12861083.9.
Decision to Grant a Patent dated Mar. 17, 2016 in corresponding Japanese application No. 2011-288838 (with English translation).
Office Action dated Oct. 20, 2017 in corresponding European patent application No. 12861083.9.
Office Action dated Jun. 6, 2018 in European Application No. 12861083.9.

* cited by examiner

JOINT STRUCTURE FOR COMPOSITE MEMBER

BACKGROUND OF THE INVENTION

1. Technical Field

The present invention relates to a joint structure for a composite member made from a composite material.

2. Description of the Related Art

Fiber-reinforced composite materials (hereinafter referred to as "composite material(s)") having a fiber as a reinforcing material and a resin as a matrix material, including CFRP (carbon fiber reinforced plastic), GFRP (glass fiber reinforced plastic), BFRP (boron fiber reinforced plastic) and AFRP (aramid fiber reinforced plastic), are used as materials having light weight and high strength in various fields. For example, CFRP employing a carbon fiber reinforced plastic has both extremely high strength and light weight, and it is widely used in various industrial fields including aircrafts, ships and automobiles.

When a composite member made from such a composite material is joined to a counterpart member as a target of a joint, a joint structure 1' where a fastener member such as a bolt 30 is inserted into a through-hole 24 formed through a composite material plate 10 (a composite member) and a flange 20a of a counterpart member 20, and a nut 32 is tightened to fix the bolt 30, to fasten the composite material plate 10 and the counterpart member 20 together, as shown in FIG. 5, is usually employed.

In the joint structure 1' of such a type, in a case where a horizontal force H' acts on the counterpart member 20 and a shear load acts in a direction in which the composite material plate 10 and the counterpart member 20 may be misaligned, the nut 32 is strongly tightened to strongly fasten the composite material plate 10 and the counterpart member 20 together by a bolt axial force, and the joint structure 1' resists to the shear load by a frictional force on a joint surface between the composite material plate 10 and the counterpart member 20. However, in a case where the composite material plate 10 is used as a skin for a main wing of an airplane, for example, in order to obtain a design on the safe side, the joint structure 1' is designed so as to be capable of resisting the shear load by contact pressure (bearing contact pressure) at a contact portion (a' in FIG. 5) between the bolt 30 and the composite material plate 10 even when the nut is loosened.

In a case where the acting horizontal force H is large, an increased number of bolts 30 are used, and bolts 30 having a larger size are used. However, if such countermeasures are insufficient, the joint structure 1' is designed so that the thickness of the composite material plate 10' is increased to increase the area of contact portion a' (bearing area) between the bolt 30 and the composite material plate 10', whereby the bearing contact pressure is suppressed under an acceptable value.

SUMMARY OF THE INVENTION

1. Technical Problem

However, in increasing the thickness of the above composite material plate 10', there are problems in the production of the composite member, as described below.

That is, as schematically illustrated in FIG. 7A, the composite material plate 10 is formed by laminating and uniting composite member forming materials 10a in the form of sheets containing a fiber and a resin. Thus, when a composite material plate 10' having an increased thickness is formed, as illustrated in FIG. 7B, it is necessary to prepare, in addition to the composite member forming materials 10a, composite member forming materials 10a' having a length different from the composite member forming materials 10a, and to laminate and unite them in a tapered shape. That is, such production of the composite material plate 10' is complex and involves significant costs.

Further, there is restriction in the rate of change of the thickness (angle of gradient of the taper) of the composite material plate 10', and it is not possible to change the thickness of the plate very drastically. Thus, there is a problem such that a thickness of a part other than the part of which thickness needs to be increased, is necessarily increased, and thereby additional materials are required, and the weight of the composite material plate 10' is necessarily increased.

Further, JP Sho58-71151 A discloses a fastener joint structure for a composite material article where a boss obtained by forming a composite material in a spiral form is provided at a joint portion of the composite material article, and a fastener member such as a bolt is inserted into a joint hole through the boss. However, in the joint structure of the JP 58-71151, there is a problem such that it is difficult to provide the boss of a spiral form at the joint portion of the composite material article.

The present invention has been made in view of the above problems in the prior art and an object of the present invention is to provide a joint structure for a composite member which has a structure that is lightweight and obtainable at a low cost, which is easy to manufacture, and which is resistible against a large shear load.

2. Solution to the Problem

The present invention has been made to solve the above problems and provides a joint structure for a composite member made from a composite material, comprising a plate for increasing thickness adhered to at least one side of the composite member.

The composite member and a counterpart member are fastened together by inserting and fixing a fastener member into a through-hole formed through the composite member, the plate for increasing thickness, and the counterpart member to be joined to the composite member.

The above joint structure for a composite member of the present invention comprises a plate for increasing thickness adhered to at least one side of the composite member. Thus, the bearing area is increased by the thickness of the plate for increasing thickness, whereby the bearing contact pressure may be suppressed. In adhering of such a plate for increasing thickness, there is less restriction than in increasing the thickness of the composite member itself, and such a joint structure is easy to manufacture. Further, the plate for increasing thickness may be adhered only to a portion where the thickness is required to be increased, whereby an additional material may not be necessary, and a light-weight and low-cost structure may be obtained.

In the present description, "adhere" means to adhere a plate for increasing thickness to a composite member. Specific examples of an adhesion method include a method of adhering the plate for increasing thickness to the composite member with an adhesive, a method of stacking the composite member and the plate for increasing thickness via an adhesive and mechanically bonding them by pressure, and a method of heating the composite member and the plate for increasing thickness in a state where they are stacked to unifying them in the case where the composite member or the plate for increasing thickness contains a thermosetting resin.

In the above invention, the plate for increasing thickness may be made from the same composite material as the composite member.

When the plate for increasing thickness is made from the same composite material as the composite member, there is no difference in thermal expansion between the plate for increasing thickness and the composite member, whereby the adhesion property may be stable with no influence by thermal stress or thermal deformation associated with a change in temperature.

In the above invention, the plate for increasing thickness may be made from a metal material.

When the plate for increasing thickness is made from a metal material, a joint structure for a composite member taking advantage of the properties of the metal material may be obtained. That is, for example, by making the plate for increasing thickness from a metal material having a high ductility and providing a through-hole formed through the composite member having a diameter larger than the through-hole formed through the plate for increasing thickness, the bearing contact pressure may be homogenized among a plurality of fastener members, as will be described later.

In the above invention, the plate for increasing thickness may be made from a resin-based material having ductility higher than the composite member.

By making the plate for increasing thickness from a resin-based material having a ductility higher than the composite member and providing a through-hole formed through the composite member having a diameter larger than the through-hole formed through the plate for increasing thickness, the bearing contact pressure may be homogenized among a plurality of fastener members, as will be described later.

Further, for example, by employing a metal material having a high strength and providing a through-hole formed through the composite member having a diameter larger than the through-hole formed through the plate for increasing thickness, it is possible to obtain a structure resistible against a shear load only by the plate for increasing thickness without bringing the composite member into contact with the fastener member.

In the above invention, it is preferred that the plate for increasing thickness is adhered to both sides of the composite member.

When the plate for increasing thickness is adhered to both sides of the composite member, the stress distribution of the composite member may be uniform as compared with the case where the plate for increasing thickness is adhered only to one side of the composite member. Further, the adhesion area between the plate for increasing thickness and the composite material is twice, whereby the shear force acting on the adhesion surface may be reduced by ½.

3. Advantageous Effects

According to the present invention, the bearing area may be increased by adhering a plate for increasing thickness to a composite member to prevent an excessive bearing contact pressure from acting. Thus, it is possible to provide a joint structure for a composite member which has a structure that is lightweight and obtainable at a low cost, which is easy to manufacture, and which is resistible against a large shear load, as compared with a conventional joint structure for a composite member where the thickness of the composite member itself is increased.

DETAILED DESCRIPTION OF THE INVENTION

Embodiments of the present invention will now be described in detail with reference to the accompanying drawings.

It is intended, however, that unless particularly specified, dimensions, materials, shapes, relative positions and the like of components described in the embodiments shall be interpreted as illustrative only and not limitative of the scope of the present invention.

Figure 1A:
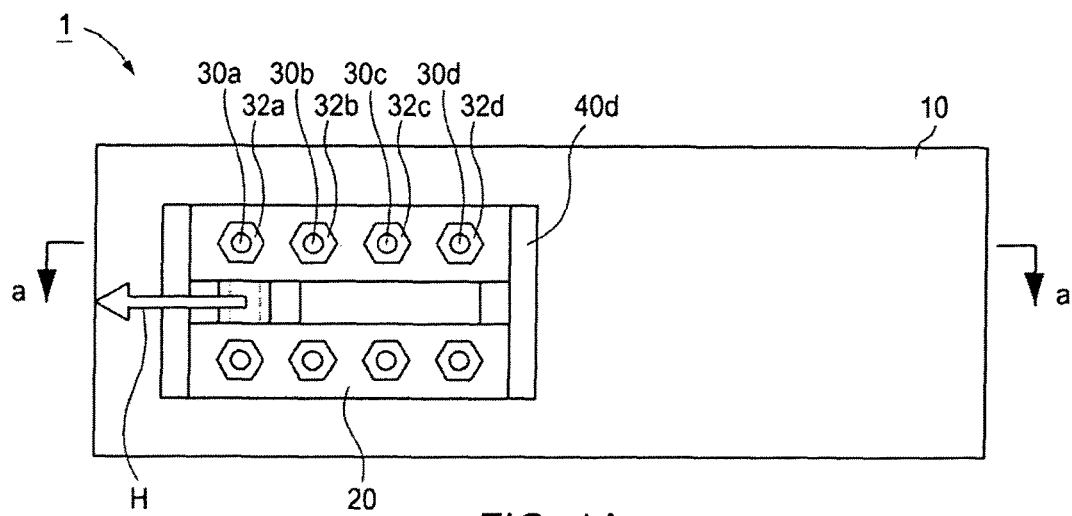
FIG. 1A is a diagram illustrating an embodiment of the joint structure for a composite member according to the present invention.
Figure 1B:
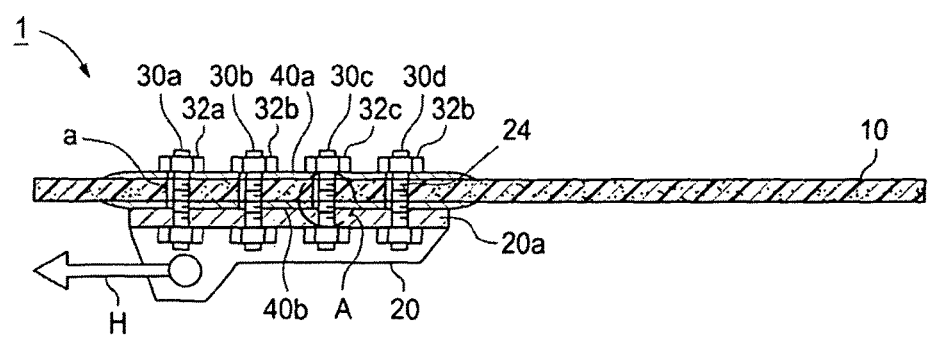
FIG. 1B is a diagram illustrating an embodiment of the joint structure for a composite member according to the present invention.

FIGS. 1A and 1B are diagrams illustrating an embodiment of the joint structure for a composite member according to the present invention, and FIG. 1A is a plan view, and FIG. 1B is a cross-sectional view taken along line a-a.

As illustrated in FIGS. 1A and 1B, the joint structure for a composite member 1 according to an embodiment of the present invention is a joint structure for a composite material plate 10 (a composite member) in the shape of a flat plate made from a composite material, wherein a counterpart member 20 is joined to the composite material plate 10 with a plurality (2×4) of bolts 30 and nuts 32 (fastener members).

In the present description, "a composite material" means a fiber-reinforced composite material having a fiber as a reinforcing material and a resin as a matrix material. Specific examples thereof include CFRP (carbon fiber reinforced plastic), GFRP (glass fiber reinforced plastic), BFRP (boron fiber reinforced plastic) and AFRP (aramid fiber reinforced plastic).

The counterpart member 20 to be joined to the composite material plate 10 is not particularly limited and may be a member made from the same composite material as the composite material plate 10 or a member made from another material. In this embodiment, a large horizontal force H acts on the counterpart member 20, whereby a shear force acts on the joint surface between the composite material plate 10 and the counterpart material 20. Further, as a reaction force to the shear force acting on the composite material, a bearing contact pressure acts at the contact portion (portion a in FIG. 1B) between the bolt 30 and the composite material plate 10.

Further, as illustrated in FIG. 1B, on both sides of the composite material plate 10, plates for increasing thickness 40a and 40b are adhered, respectively. In this embodiment, the plates for increasing thickness 40a and 40b are adhered to the both sides of the composite material plate with a resin-type adhesive. In the present description, "adhere" means to adhere a plate for increasing thickness to a composite member. Specific examples of an adhesion method include, in addition to the above method of adhesion, a method of stacking the composite member and the plate for increasing thickness via an adhesive and mechanically bonding them by pressure, and a method of heating the composite member and the plate for increasing thickness in a state where they are stacked to unify them in the case where the composite member or the plate for increasing thickness contains a thermosetting resin.

Figure 2A:
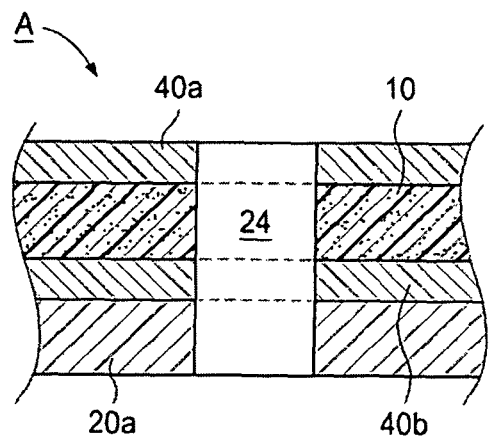
FIG. 2A is an enlarged cross-sectional view illustrating portion A which shows plates for increasing thickness made from a different material than the composite material plate.
Figure 2B:
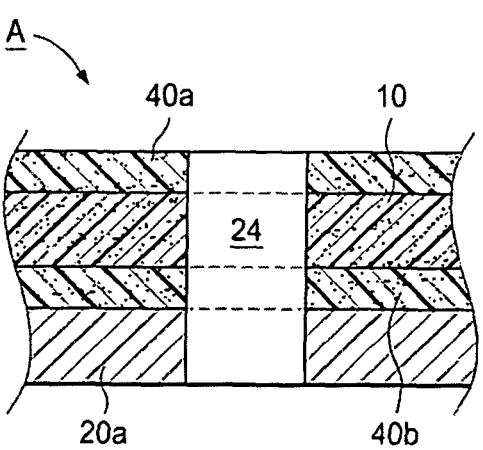
FIG. 2B is an enlarged cross-sectional view illustrating portion A in FIG. 1A however the plates for increasing thickness are made from the same composite material as the composite material plate.

Then, as illustrated in FIGS. 2A and 2B, the composite material plate 10 and the counterpart member 20 are fastened together by inserting the bolt 30 into a through-hole 24 formed through the composite material plate 10, the plates for increasing thickness 40a and 40b, and a flange 20a of the counterpart member 20, and fixing it by tightening the nut 32. When the plates for increasing thickness 40a and 40b are adhered to the composite material plate 10 as above, it is possible to increase the bearing area by the thickness of the plates for increasing thickness 40a and 40b, thereby to suppress the bearing contact pressure.

The plates for increasing thickness 40a and 40b may be made from the same composite material as the composite material plate 10 as shown in FIG. 2B, or may be made from a material different from the composite material plate 10 as shown in FIG. 2A. A proper material may be employed in accordance with e.g. the use of the composite material plate 10. In a case where the plates for increasing thickness 40a and 40b are made from a material different from the composite material plate 10, they are preferably made from a material having a ductility higher than the composite material plate 10 e.g. a metal material or a resin-based material having a ductility higher than the composite material plate 10, for the reason described later.

An advantageous point in the case where the plates for increasing thickness 40a and 40b are made from the same composite material as the composite material plate 10, may, for example, be that there is no difference in thermal expansion between the composite material plate 10, and the plates for increasing thickness 40a and 40b, whereby the adhesion property may be stable with no influence by thermal stress or thermal deformation associated with a change in temperature.

Further, an advantageous point in the case where the plates for increasing thickness 40a and 40b are made from a metal material, may, for example, be that a joint structure for a composite material plate 10 taking advantage of the properties of the metal material may be obtained. Specifically, for example, by making the plates for increasing thickness 40a and 40b from a metal material having a high ductility and providing a through-hole formed through the composite material plate 10 having a diameter larger than the through-hole formed through the plates for increasing thickness 40a and 40b, the bearing contact pressure may be homogenized among the bolts 30a to 30d. Further, an advantageous point in the case where the plates for increasing thickness 40a and 40b are made from a resin-based material having a ductility higher than the composite material plate 10, may be the same, and by providing a through-hole formed through the composite material plate 10 having a diameter larger than the through-hole formed through the plates for increasing thickness 40a and 40b, the bearing contact pressure may be homogenized among the bolts 30a to 30d. This will be described with reference to FIG. 3A, FIG. 3B and FIG. 4.

Figure 3A:
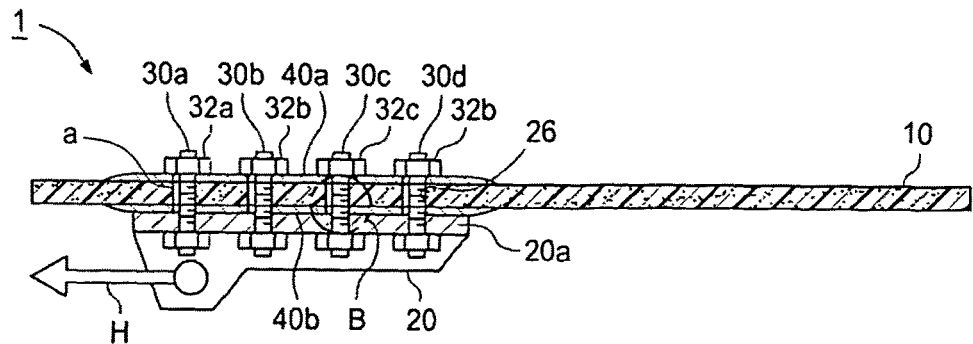
FIG. 3A is a diagram illustrating another embodiment of the joint structure for a composite member according to the present invention.
Figure 3B:
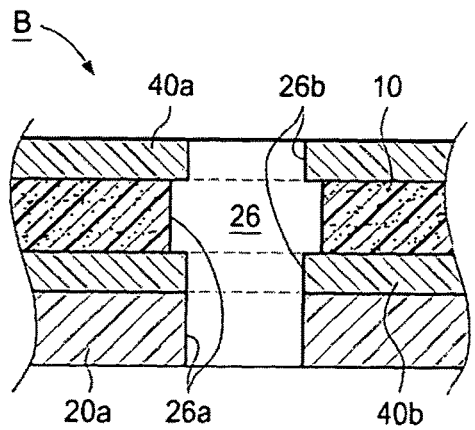
FIG. 3B is a diagram illustrating another embodiment of the joint structure for a composite member according to the present invention.
Figure 4:
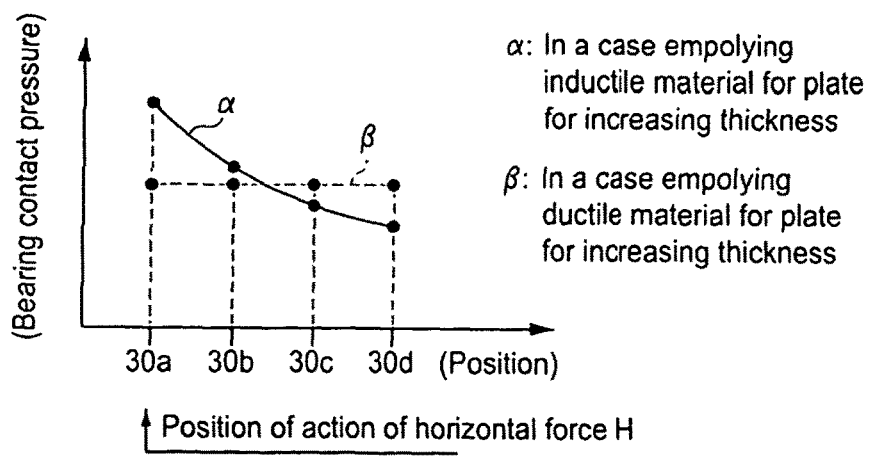
FIG. 4 is a chart showing a relationship between a position of a bolt and a bearing contact pressure.
Figure 5:
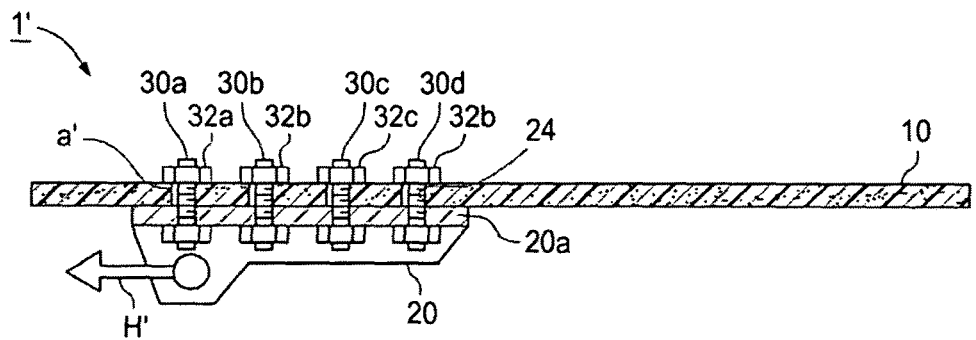
FIG. 5 is a cross-sectional view illustrating a conventional joint structure for a composite member.
Figure 6:
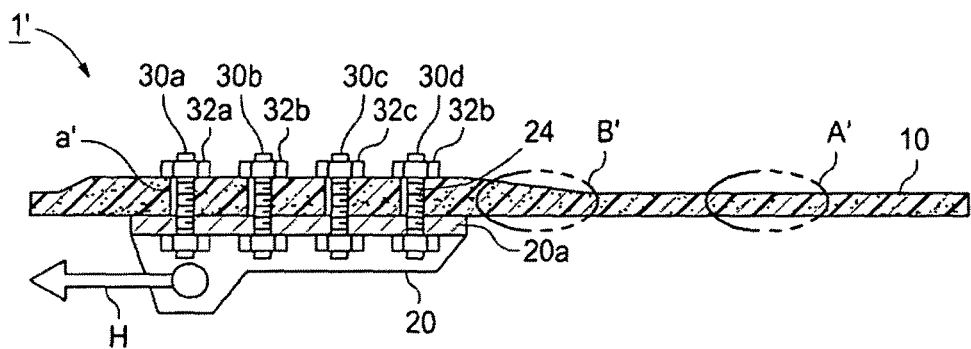
FIG. 6 is a cross-sectional view illustrating a conventional joint structure for a composite member.
Figure 7A:
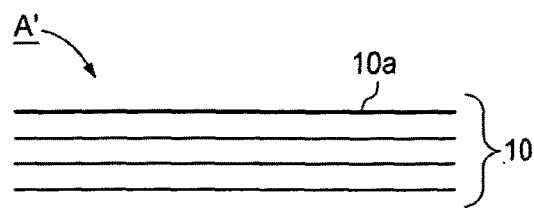
FIG. 7A is a schematic cross-sectional view schematically illustrating portion A' and portion B' in FIG. 6.
Figure 7B:
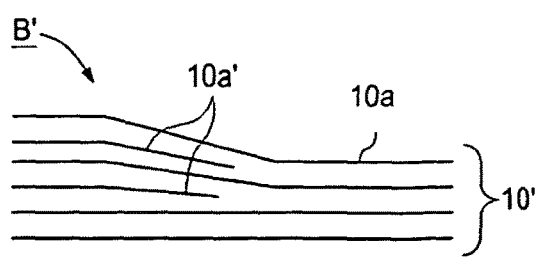
FIG. 7B is a schematic cross-sectional view schematically illustrating portion A' and portion B' in FIG. 6.

FIGS. 3A and 3B are diagrams illustrating another embodiment of the joint structure for a composite member according to the present invention, and FIG. 3A is a cross-sectional view, and FIG. 3B is an enlarged view of portion B. FIG. 4 is a chart showing a relationship between a position of a bolt and a bearing contact pressure, and in FIG. 4, α is a graph in a case where an inductile material is employed for the plates for increasing thickness 40a and 40b, and β is a graph in a case where a material having a high ductility (e.g. a metal material) is employed for the plates for increasing thickness 40a and 40b.

In the joint structure for a composite member as illustrated in FIGS. 3A and 3B, in the through-hole 26 formed through the composite material plates 10, the plates for increasing thickness 40a and 40b, and the flange 20a of the counterpart member 20, a through-hole 26a of the composite material plate has a diameter larger than a diameter of a through-hole 26b of the plates for increasing thickness 40a and 40b, which is different from the above-described embodiment.

As shown by α in FIG. 4, the bearing contact pressure is largest at the bolt 30a which is in the vicinity of the position of action of the horizontal force H, and it becomes smaller as the distance from the position of action of the horizontal force H becomes larger. However, in the case of forming the through-hole 26 as described above and employing a metal material or a resin-based material having a ductility higher than the composite material plate 10 for the plates for increasing thickness 40a and 40b, in the through-hole 26 into which the bolt 30 is inserted, the bolt 30a and the through-hole 26b formed through the plates for increasing thickness 40a and 40b come into contact with each other, and the plates for increasing thickness 40a and 40b become plastically deformed, whereby the diameter of the through-hole 26b is expanded. This amount of expansion is largest at the through-hole 26 into which the bolt 30a at which the bearing contact pressure is large, is inserted, and the amount of expansion is smallest at the through-hole 26 into which the bolt 30d at which the bearing contact pressure is small, is inserted. The contact between the bolts 30a to 30d and the plates for increasing thickness 40a and 40b may thereby be homogenized, and the bearing contact pressure may be homogenized among the bolts 30a to 30d, as shown by β in FIG. 4. Thus, it is possible to prevent a concentration of the bearing contact pressure to one of the bolts 30, thereby to reduce a breakage risk of a bolt 30.

Further, in this embodiment, for example, by employing a metal material having a high strength for the plates for increasing thickness 40a and 40b, it is possible to obtain a structure resistible against a shear load only by the plates for increasing thickness 40a and 40b without bringing the composite material plate 10 into contact with the bolt 30.

In the present invention, as the metal material used for the plates for increasing thickness 40a and 40b, a metal material which has a high ductility, a high strength and a light weight is preferred, and for example, a titanium alloy, a high-nickel alloy or a cobalt alloy such as MP-35N (AMS5758) or Inco600 (AMS5687), or a corrosion-resistant steel such as A286 (AMS5731, AMS5737), may be particularly preferably used.

Further, in the present invention, as the resin-based material used for the plates for increasing thickness 40a and 40b, in the case of employing CFRP for the composite material plate 10, may, for example, be a composite material having a ductility higher than CFRP, such as GFRP or AFRP. Further, as the resin-based material according to the present invention, a resin material which is not fiber-reinforced may also be employed, and a resin material having a strength equal or more than an epoxy resin and having a ductility higher than the composite material plate 10, e.g. polycarbonate, may be mentioned.

As described above, the joint structure for a composite member according to the present invention comprises the plates for increasing thickness 40a and 40b adhered to both sides of the composite material plate 10, and the bearing area may be increased by the thickness of the plates for increasing thickness 40a and 40b, whereby the bearing contact pressure may be suppressed. In adhering the plates for increasing thickness 40a and 40b to the composite material plate 10, there is less restriction than in increasing the thickness of the composite member itself as in conventional art, and such a joint structure is easy to manufacture. Further, according to the present invention, the plates for increasing thickness 40a and 40b may be adhered only to a portion where the thickness is required to be increased, whereby an additional material may not be necessary, and a light-weight and low-cost structure may be obtained.

In the above embodiment, the plates for increasing thickness 40a and 40b are adhered to both sides of the composite material plate 10. It is preferred that the plates for increasing thickness 40a and 40b are adhered to each of both sides of the composite material plate 10 as above because the stress distribution of the composite material plate 10 may thereby be uniform as compared with the case where the plate for increasing thickness 40 is adhered only to one side of the composite material plate 10. Further, the adhesion area between the plate for increasing thickness 40 and the composite material plate 10 is doubled, and thereby the shear force acting on one adhesion surface may be reduced by ½.

However, the joint structure 1 for a composite member of the present invention is not limited thereto, and it may be such that the plate for increasing thickness is adhered to at least one side of the composite member.

Further, in the above embodiment, an example of the joint structure 1 for the composite material plate 10 in the shape of a flat plate; however, the composite member according to the present invention is not limited to a composite member in the shape of a flat plate, and it may, for example, be a composite member in the form of a tube.

Some preferred embodiments of the present invention are described above; however, the present invention is by no means limited thereto and further modifications and variations may be made without departing from the scope of the invention.

The present invention may be applicable in various industrial fields including aircrafts, ships and automobiles, as a joint structure for a composite member made from a composite material.

The invention claimed is:

1. A joint structure for a composite member made from a fiber-reinforced composite material having fiber as a reinforcing material and resin as a matrix material, the joint structure comprising:
  a plate for increasing thickness adhered to at least one side of the composite member;
  wherein the composite member and a counterpart member are fastened together by inserting and fixing at least three fastener members in through-holes formed through the composite member, the plate for increasing thickness, and the counterpart member to be joined to the composite member,
  the joint structure is configured so that a shear force acts between the composite member and the counterpart member,
  the at least three fastener members are disposed at equal intervals along a direction of action of the shear force,
  the plate for increasing thickness is made from a metal material,
  each of the through-holes formed through the composite member has a diameter larger than a diameter of the corresponding through-hole formed through the plate for increasing thickness and the counterpart member, so that the joint structure is configured to resist shear load by the plate for increasing thickness without bringing the composite member into contact with the at least three fastener members,
  the through-holes are not filled with a filling material,
  the plate for increasing thickness is adhered to the composite member by an adhesive, and
  the plate for increasing thickness comprises a first plate adhered to a first side of the composite member, and a second plate adhered to a second side of the composite member, the second plate being disposed between the composite member and the counterpart member.

2. The joint structure for a composite member according to claim 1, wherein each of the through-holes formed though the composite member has a same diameter from one surface of the composite member to another surface of the composite member and each of the through holes is formed so as to have a clearance with a constant distance with the at least three fastener members.

3. A joint structure for a composite member made from a fiber-reinforced composite material having fiber as a reinforcing material and resin as a matrix material, the joint structure comprising:
  a plate for increasing thickness adhered to at least one side of the composite member, wherein:
  the composite member and a counterpart member are fastened together by inserting and fixing at least three fastener members in through-holes formed through the composite member, the plate for increasing thickness, and the counterpart member to be joined to the composite,
  the joint structure is configured so that a shear force acts between the composite member and the counterpart member,
  the at least three fastener members are disposed at equal intervals along a direction of action of the shear force,
  the plate for increasing thickness is made from a metal material, each of the through-holes formed through the composite member has a diameter larger than a diameter of the corresponding through-hole formed through the plate for increasing thickness and the counterpart member, so that the joint structure is configured to resist shear load by the plate for increasing thickness without bringing the composite member into contact with the at least three fastener members, the through-holes are not filled with a filling material, the plate for increasing thickness is adhered to the composite member by stacking the composite member and the plate for increasing thickness via an adhesive and by bonding these structures together by pressure, and the plate for increasing thickness comprises a first plate adhered to a first side of the composite member, and a second plate adhered to a second side of the composite member, the second plate being disposed between the composite member and the counterpart member.

4. The joint structure for a composite member according to claim 3, wherein each of the through-holes formed though the composite member has a same diameter from one surface of the composite member to another surface of the composite member and each of the through holes is formed so as to have a clearance with a constant distance with the at least three fastener members.

5. A joint structure for a composite member made from a fiber-reinforced composite material having a fiber as a reinforcing material and a resin as a matrix material, the joint structure comprising a plate for increasing thickness adhered to at least one side of the composite member, wherein:

the composite member and a counterpart member are fastened together by inserting and fixing at least three fastener members in through-holes formed through the composite member, the plate for increasing thickness, and the counterpart member to be joined to the composite, the joint structure is configured so that a shear force acts between the composite member and the counterpart member, the at least three fastener members are disposed at equal intervals along a direction of action of the shear force, the plate for increasing thickness is made from a metal material, each of the through-holes formed through the composite member has a diameter larger than a diameter of the corresponding through-hole formed through the plate for increasing thickness and the counterpart member, so that the joint structure is configured to resist shear load only by the plate for increasing thickness without bringing the composite member into contact with the at least three fastener members, the through-holes are not filled with a filling material, at least one of the plate for increasing thickness and the composite member contains a thermosetting resin, the plate for increasing thickness is adhered to the composite member by heating in a state where the plate for increasing thickness and the composite member being stacked to unify these structures together, and the plate for increasing thickness comprises a first plate adhered to a first side of the composite member, and a second plate adhered to a second side of the composite member, the second plate being disposed between the composite member and the counterpart member.

6. The joint structure for a composite member according to claim 5, wherein each of the through-holes formed though the composite member has a same diameter from one surface of the composite member to another surface of the composite member and each of the through holes is formed so as to have a clearance with a constant distance with the at least three fastener members.

* * * * *